United States Patent [19]
Kudoh et al.

[11] Patent Number: 4,959,753
[45] Date of Patent: Sep. 25, 1990

[54] SOLID ELECTROLYTIC CAPACITOR AND METHOD OF MANUFACTURING THE SAME

[75] Inventors: Yasuo Kudoh, Yokohama; Sohji Tsuchiya, Kanagawa; Toshikuni Kojima, Kawasaki; Masao Fukuyama; Susumu Yoshimura, both of Yokohama; Kenji Kuranuki, Kyoto, all of Japan

[73] Assignee: Matsushita Electric Industrial Co., Ltd., Japan

[21] Appl. No.: 404,465

[22] Filed: Sep. 8, 1989

[30] Foreign Application Priority Data

Sep. 9, 1988 [JP] Japan ................................. 63-227024
Nov. 11, 1988 [JP] Japan ................................. 63-286136
Jun. 29, 1989 [JP] Japan ................................. 1-169311

[51] Int. Cl.$^5$ .......................... H01G 9/00; B01J 17/00
[52] U.S. Cl. ..................................... 361/525; 29/25.03
[58] Field of Search ............................... 361/523–527; 29/570.1

[56] References Cited

U.S. PATENT DOCUMENTS 4,780,796 10/1988 Fukuda et al. ..................... 361/525
4,785,380 11/1988 Harakawa et al. .................. 361/525
4,803,596 2/1989 Hellwig et al. ..................... 361/525

Primary Examiner—Donald A. Griffin
Attorney, Agent, or Firm—Lowe, Price, Leblanc, Becker & Shur

[57] ABSTRACT

A solid electrolytic capacitor comprising:
an electrolyte comprising a conductive polymer (i) having a repeating unit of at least one compound selected from a heterocyclic compound and (ii) containing as a dopant at least one anion selected from a napthalenesulfonate, an alkyl naphthalenesulfonate at least one of hydrogen atoms on the naphthalene ring of which has been substituted with an alkyl group having 1 to 12 carbon atoms, an anthraquinoesulfonate, and an alkyl anthraquinonesulfonate at least one of hydrogen atoms on the anthraquinone ring of which has been substituted with an alkyl group having 1 to 12 carbon atoms;
said electrolyte being provided on a valve metal on the surface of which a dielectric film is formed by anodic oxidation or anodic chemical conversion.
Also disclosed is a method of manufacturing the solid electrolytic capacitor, in which the electrolyte is formed by electrolytic polymerization.

18 Claims, 3 Drawing Sheets

SOLID ELECTROLYTIC CAPACITOR AND METHOD OF MANUFACTURING THE SAME

BACKGROUND OF THE INVENTION

1. Field of the Invention

This invention relates to a solid electrolytic capacitor using a conductive polymer as an electrolyte, which capacitor has superior capacitor characteristics, in particular, frequency characteristics and reliability characteristics under conditions of high temperature and high humidity. It also relates to a method of manufacturing the same.

2. Description of the Prior Art

In recent years, as electrical equipment has been made digital, capacitors are also required to have a large capacity with compactness in size and also a low impedence at high frequency regions. Capacitors used at high frequency regions have hitherto included plastic film capacitors, mica capacitors, and laminated ceramic capacitors. These capacitors, however, necessarily have a large size and hence can be made to have a large capacity with difficulty. The laminated ceramic capacitors have also the disadvantage that the temperature characteristics may become poor as the capacitor is made more compact and made to have a larger capacity, resulting in a very high cost.

On the other hand, those known as capacitors of a large capacity type include aluminum dry electrolytic capacitors, and aluminum or tantalum solid electrolytic capacitors. These capacitors can achieve a large capacity since the anode oxide film that serves as a dielectric can be made very thin, but, on the other hand, are required to be provided with an electrolyte between the oxide film and cathode for the purpose of repairing damage. In the aluminum conductive composition, when used, anode and cathode aluminum foils applied with etching are wound up interposing a separator and the separator is impregnated with a liquid electrolyte. Hence, they have the disadvantages such that a decrease of electrostatic capacity or increase of loss (tan δ) may increasingly occur with time because of leakage, evaporation or the like of the liquid electrolyte, and at the same time the high frequency characteristics and low temperature characteristics may become extremely poor because of the ion conductivity of the electrolyte.

In the aluminum or tantalum solid electrolytic capacitors, manganese dioxide is used as a solid electrolyte so that the disadvantages in the above aluminum dry electrolytic capacitors can be better eliminated. This solid electrolyte is obtained by immersing an anode element in an aqueous manganess nitrate solution, followed by thermal decomposition at a temperature of from 250° to 350° C. In the case of this capacitor, the electrolyte is solide, and therefore can be free from the disadvantages that the electrolyte is evaporated at high temperatures and its performance is lowered because of its solidification at low temperatures, so that it can show good frequency characteristics and temperature characteristics compared with the capacitors that employ the liquid electrolyte. The impedance or loss at high frequency regions, however, are in values which are higher by the factor of 1 figure than those of the laminated ceramic capacitors or plastic film capacitors, for the reasons that the oxide film may be damaged because of the thermal decomposition of manganese nitrate and the manganese dioxide has a high specific resistance.

On the other hand, it is recently proposed that an organic semiconductor, 7,7,8,8-tetracyanoquinodimethane complex salt (hereinafter "TCNQ salt"), having a high electrical conductivity and superior anodic oxidation ability, is used as a solid electrolyte in place of the manganese dioxide. As disclosed in Japanese Patent Publication No. 56-10777 concerning an invention made by the same applicants as those in the present application and in Japanese Laid-open Application No. 58-17609 concerning an invention made by Shin-ichi Niwa et al, the aluminum solid electrolytic capacitor using such a TCNQ salt can achieve remarkably improved frequency characteristics and temperature characteristics and low leakage current characteristics. The TCNQ salt has also so a superior thermal stability for a conductive material of an organic matter that the resulting capacitor is noted to have a high temperature lifetime greatly surpassing that of the conventional dry electrolytic capacitor.

This organic semiconductor can be impregnately coated on the oxide film by dissolving it in an organic solvent or using a melting means by heating, and hence can prevent the oxide film from being damaged by the thermal decomposition that occurs when impregnated with $MnO_2$. The TCNQ salt has such a high electrical conductivity and such a superior anodic oxidation ability that it can achieve good high frequency characteristics to provide a capacitor with a large capacity.

For example, there is a patent application for an invention in which an organic semiconductor comprising N-n-propyl-or N-iso-propylisoquinoline and the TCNQ salt (Japanese Laid-open Application No. 58-17609) is used as the solid electrolytic capacitor. According to the invention disclosed therein, a wind-up type aluminum electrolytic capacitor is impregnated with the TCNQ salt by heat-melting the TCNQ salt, so that a strong bond is attained between the TCNQ salt and oxide film. Thus, with the aid also of the fact that the TCNQ salt contributes the high electrical conductivity, it is possible to prepare an aluminum capacitor remarkably improved in the frequency characteristics and temperature characteristics. As having been already disclosed in the above Japanese Laid-open Application No. 58-17609 concerning an invention made by the same applicants, in which the organic semiconductor based on such a TCNQ salt is used as the solid electrolyte, the TCNQ salt, hving a higher electrical conductivity and a higher anodix oxidation ability (repairing action) than the manganese dioxide, enables performance which is superior both in the frequency characteristics and temperature characteristics to the solid electrolytic capacitor using the manganese dioxide. In this prior art invention, a TCNQ salt comprised of a cation comprising isoquinolium substituted at its N-position with an alkyl group is heated and melted so that the oxide film is impregnated with it.

In more recent years, a solid electrolytic capacitor has been proposed in which a heterocyclic monomer such as pyrrole and thiophene is subjected to electrolytic polymerization using a support electrolyte, and a highly conductive polymer containing an anion of the support electrolyte as a dopant is thereby formed on an anode, which is used as an electrolyte (Japanese Laid-open Applications No. 60-37114 and No. 60-233017).

As the dopant for the conductive polymer, commonly used as halide ions such as perchlorate ions and tetrafluoroborate ions, or paratoluenesulfonate ions. However, use of the conductive polymer containing any of these halide ions as the dopant tends to cause dedoping. In particular, this tendency is remakable at high temperatures. Thus, when exposed to a high temperature, the problem may arise such that the electrical characteristics of the conductive polymer can be kept stable with difficulty. There also has been the problem that the ions thus dedoped tend to deteriorate an anode aluminum dielectric film. The paratoluenesulfonate ions, though relatively stable in a dried state, further have had the problem that the presence of water brings about deterioration of the aluminum dielectric film. These make larger the leakage current of capacitors and also cause great changes with time in capacity, loss, etc., so that it has been difficult to realize a solid electrolytic capacitor with high characteristics and high reliability in which the conductive polymer is used as the electrolyte.

In the electrolytic polymerization reaction, the oxide film must be destroyed before a polymer film can be applied on the oxide film serving as a dielectric, through the reaction process of the electrolytic oxidation of monomers. Alternatively, an electrolytic polymer film is applied on a valve metal before the oxide film is formed, followed by chemical conversion reaction. Thus the oxide film can be formed. On this occasion, however, the chemical conversion reaction is carried out through the electrolytic polymer film, so that the electrolytic polymer film may undergo changes in quality or the adhesion to the valve metal may be lowered. Hence, it has been hitherto considered difficult to provide a method by which a good electrolytic polymer film is formed on the valve metal.

SUMMARY OF THE INVENTION

An object of the present invention is to solve the above problems involved in the prior art and provide a solid electrolytic capacitor having superior capacitor characteristics particularly for frequency characteristics and reliability under high temperature and high humidity conditions, and a method of manufacturing the same.

Another object of the present invention is to provide a solid electrolytic capacitor that has superior initial capacity and loss characteristics, may undergo less deterioration of these even when left to stand at high temperature and under unloading, and has superior reliability characteristics, and a method of manufacturing the same.

Still another object of the present invention is to provide a method of manufacturing a solid electrolytic capacitor, that can achieve an improvement in the adhesion strength of an electrolyte to an oxide film, an improvement in the stability of an electrolyte and a decrease in leakage current, and also can achieve an improvement in capacitor characteristics.

The present invention can attain the above objects. As a technical means therefor, the present invention provides a solid electrolytic capacitor comprising;

an electrolyte comprising a conductive polymer (i) having a repeating unit of at least one compound selected from the heterocyclic compound and (ii) containing as a dopant at least one anion selected from a naphthalenesulfonate, an alkyl naphthalenesulfonate at least one of hydrogen atoms on the naphthalene ring of which has been substituted with an alkyl group having 1 to 12 carbon atoms, an anthraquinonesulfonate, and an alkyl anthraquinonesulfonate at least one of hydrogen atoms on the anthraquinone ring of which has been substituted with an alkyl group having 1 to 12 carbon atoms;

said electrolyte being provided on a value metal on the surface of which a dielectric film is formed by anodic oxidation or anodic chemical conversion.

In the method of manufacturing a solid electrolytic capacitor according to the present invention, the electrolyte comprising the above conductive polymer is formed by electrolytic polymerization.

As a preferred embodiment of the method, the present invention provides a method of manufacturing a solid electrolytic capacitor, comprising the steps of;

forming on a valve metal an anodized film and thereafter adhering thereon manganese dioxide; and forming a film of a conductive electrolytically polymerized polymer, using a polymerization solution containing a solvent, a monomer, an electrolyte and a polymer having a carboxylic acid group or a hydroxyl group.

DETAILED DESCRIPTION OF THE PREFERRED EMBODIMENTS

Figure 1:
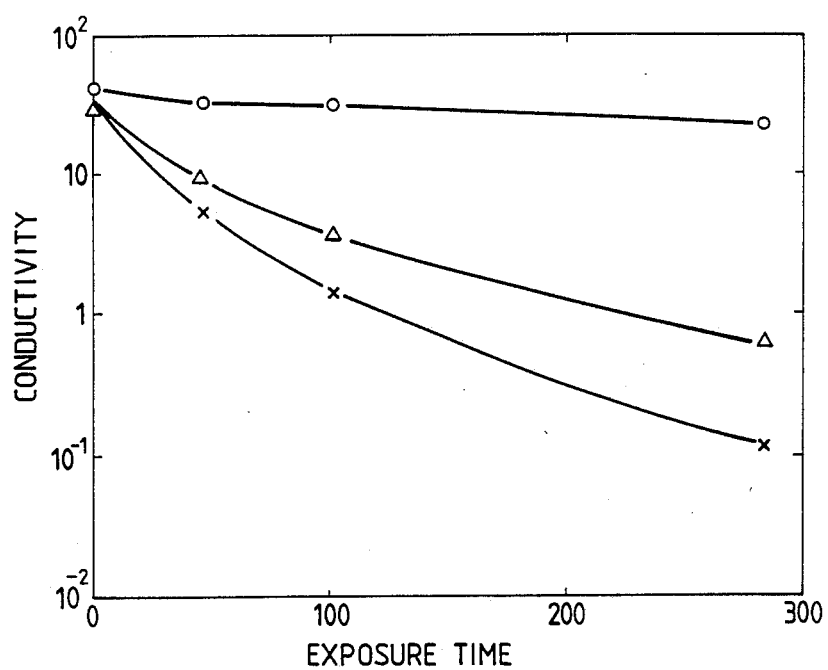
FIG. 1 is a graph to show changes with time of electrical conductivity measured on an electrolyte conductive polymer film of the present invention and conventionally known conductive polymer films when exposed to a high temperature.

The sulfonate that can be used in the present invention may contain at least one sulfone group per one naphthalene ring or anthraquinone ring. The alkyl group that may be substituted on the naphthalenesulfonate or anthraquinonesulfonate may be of any form, a straight-chain form or a branched form. When substituted with the alkyl group, all sulfonates can be used so long as the number of the alkyl group is at least one per one ring of the naphthalene ring or anthraquinone ring, and the number of carbon atoms of the alkyl group is at least one. Since, however, the solubility may be abruptly lowered with an increase in the number of substitutents or number or carbon atoms of the alkyl group, preferably used are sulfonates, when substituted with the alkyl group, having the substituent(s) in the range of from 1 to 3 per one ring of the naphthalene ring or anthraquinone ring, and having the carbon atom number of the alkyl group in the range of from 1 to 12. The anion to be doped may comprise one kind selected from the above compounds or may comprise a mixture of any of them.

The heterocyclic compound that can be used includes pyrrole, thiophene, furan, or derivatives thereof. The former two may preferably be used. Aluminum is preferred an an anode metal serving as the valve metal. Besides, however, tantalum and titanium can also be used.

The conductive polymer electrolyte should preferably be formed, on the valve metal having thereon a dielectric film on which manganese dioxide is adhered, by electrolytic polymerization using the above heterocyclic compound as a monomer and the above naphthalenesulfonate or anthraquinonesulfonate, or alkyl naphthalenesulfonate or alkyl anthraquinonesulfonate, as a support electrolyte. Alternatively, it is also possible to form an electrolyte film by chemical oxidation polymerization using a suitable oxidant that may not deteriorate the dielectric film of the anode, followed by anionic exchange so that the above anion is doped. The above sulfonates used as the support electrolyte can be used in the form of a free acid, or in the form of a metal salt, ammonium salt or quaternary ammonium salt.

The conductive polymer electrolyte according to the present invention is doped with the sulfonate inion having the naphthalene ring or anthraquinone ring of bulky molecular structure, so that dedoping may occur with difficulty under high temperature and high humidity conditions and also the electrical characteristics of the conductive polymer may be deteriorated only to a very small extent. The dielectric film of the anode aluminum can also be suppressed from its deterioration due to dedoped anions. Hence, use of this polymer as an electrolyte makes it possible to obtain a solid electrolytic capacitor having a small loss and leakage current and suffering less deterioration of capacitor characteristics under high temperature and high humidity conditions. In the case of the naphthalenesulfonate or anthraquinonesulfonate, the dedoping may occur with more difficulty because of its molecular structure, and also the mechanical characteristics of the polymer film can be expected to be improved. The manganese dioxide is adhered on the anode metal provided with the dielectric film, in order that the conductive polymer film can be readily formed by electrolytic polymerization, applying a voltage through an auxiliary electrode made in contact therewith from the outside or using as an electrode the anode itself having the dielectric film, and also in order that the anode chemical conversion ability possessed by manganese dioxide can improve the repairing properties of the dielectric film.

In a preferred embodiment of the method of manufacturing the solid electrolytic capacitor according to the present invention, the electrolytic polymerization reaction is carried out using an a polymerization solution a solution containing a solvent, a monomer, an electrolyte and a polymer having a carboxylic acid group or a hydroxyl group. The anions doped in the electrolytic polymer film are stably fixed. The chemical conversion ability can be also improved, thereby achieving a decreased in leakage current.

The conductive electrolytically polymerized polymer in the method of the present invention should preferably be a polymer obtained by anodic oxidation polymerization of a monomer including pyrrole, thiophene, or derivatives thereof.

The polymer contained in the polymerization solution may preferably be a polymer selected from polyhydroxystyrene, novolac resin, polymethacrylic acid, polyacrylic acid, or copolymers of these. This polymer is optionally added in the polymerization solution. When added, the intended effect of the present invention can be more readily obtained.

EXAMPLES

The present invention will be described below in greater detail by giving Examples.

EXAMPLE 1

On a $8\times 10$ mm aluminum etched foil, a dielectric film was formed by anodic oxidation using an aqueous 3% ammonium adipate solution and applying a voltage of 35 V at about 70° C., followed by immersion in an aqueous 30% manganese nitrate solution and further heating at 250° C. for 10 minutes, thereby adhering thermally decomposed manganese dioxide on the surface. An anode was thus prepared. An auxiliary electrode made of stainless steel was brought into contact with the resulting anode foil, which were then immersed in an electrolytic solution comprising pyrrole (0.3M), sodium naphthalenesulfonate (0.15M) and water. Thus, an electrolytic polymer film comprising polypyrrole doped with naphthalenesulfonate anions was formed through the auxiliary electrode. The resulting electrolytic polymer film was washed with water and then dried. Thereafter, carbon paste and silver paste were coated on the electrolytic polymer film, a cathode lead was taken out, and further a sheathing was carried out using epoxy resin to obtain 5 pieces of capacitors. After aging at 13 V, average values for initial capacity and loss at 120 Hz and leakage current at 10 V were found to be 13.4 $\mu$F, 3.2% and 0.78 $\mu$A, respectively. After the capacitors were left to stand at 125° C. for 500 hours under unloading, the values were found to be 13.1 $\mu$F, 3.4% and 3.4 $\mu$A, respectively.

For comparison, capacitors were prepared in the same manner except that tetrabutylammonium perchlorate (0.15M) and acetonitrile were used in place of sodium naphthalenesulfonate and water, respectively. In this instance, the average values for initial capacity and loss at 120 Hz and leakage current at 10 V were found to be 12.7 $\mu$F, 3.4% and 820 $\mu$A, respectively. After the capacitors were left to stant at 125° C. for 500 hours under unloading, the values were found to be 7.5 $\mu$F, 7.1% and 1,640 $\mu$A, respectively.

As is evident from the above, when the polypyrrole doped with naphthalenesulfonate anions is used as the electrolyte, solid electrolytic capacitors can be obtained which have superior initial leakage current characteristics and also undergo less deterioration of the capacity, loss and leakage current characteristics after they were left at a high temperature and under unloading, as compared with the case of the perchlorate anions. It was also seen that substantially the same results as the high-temperature shelf test were obtained as to the characteristics measured after the capacitors were left to stand for 500 hours under unloading in environment of 80° C. and a humidity of 90%, showing a sufficiently high humidity resistance. The above results establish that the electrolytic capacitor according to the present invention has very superior initial characteristics and reliability characteristics.

EXAMPLE 2

Example 1 was repeated but using sodium isopropylnaphthalenesulfonate (0.15M) in place of sodium naphthalenesulfonate, to complete 5 pieces of capacitors. After aging at 13 V, average values for initial capacity and loss at 120 Hz and leakage current at 10 V were found to be 13.8 $\mu$F, 3.0% and 0.92 $\mu$A, respectively. After the capacitors were left to stand at 125° C. for 500 hours under unloading, the values were found to be 13.5 $\mu$F, 3.4% and 5.5 $\mu$A, respectively. Like the instant of Example 1, here was also established that the electrolytic capacitor according to the present invention has very superior initial characteristics and reliability characteristics. Capacitors were also prepared here in the same manner as to instances in which ammonium isopropylnaphthalenesulfonate and potassium isopropylnaphthalenesulfonate were respectively used, and the same results as the instance of the corresponding sodium salt were obtained.

EXAMPLE 3

Example 1 was repeated by using sodium triisopropylnaphthalenesulfonate (0.15M) in place of sodium naphthalenesulfonate, to complete 5 pieces of capacitors. After aging at 13 V, average values for initial capacity and loss at 120 Hz and leakage current at 10 V were found to be 13.1 $\mu$F, 3.5% and 0.66 $\mu$A, respectively. After the capacitors were left to stand at 125° C. for 500 hours under unloading, the values were found to be 12.9 $\mu$F, 3.8% and 4.7 $\mu$A, respectively. Like the instance of Example 1, here was also established that the electrolytic capacitor according to the present invention has very superior initial characteristics and reliability characteristics. Capacitors were also prepared as to an instance in which the pyrrole was replaced with a mixture of pyrrole and N-methylpyrrole, the solvent was changed to acetonitrile, and thiophene was further used. The same results as the above were also obtained.

EXAMPLE 4

Example 1 was repeated but using sodium n-dibutylnaphthalenesulfonate (0.15M) in place of sodium naphthalenesulfonate, to complete 5 pieces of capacitors. After aging at 13 V, average values for initial capacity and loss at 120 Hz and leakage current at 10 V were found to be 12.8 $\mu$F, 3.1% and 1.1 $\mu$A, respectively. After the capacitors were left to stand at 125° C. for 500 hours under unloading, the values were found to be 12.5 $\mu$F, 3.3% and 5.1 $\mu$A, respectively. Like the instance of Example 1, here was also established that the electrolytic capacitor according to the present invention has very superior initial characteristics and reliability characteristics.

EXAMPLE 5

Example 1 was repeated but using sodium n-dodecylnaphthalenesulfonate (0.15M) in place of sodium naphthalenesulfonate, to complete 5 pieces of capacitors. After aging at 13 V, average values for initial capacity and loss at 120 Hz and leakage current at 10 V were found to be 13.3 $\mu$F, 3.6% and 0.86 $\mu$A, respectively. After the capacitors were left to stand at 125° C. for 500 hours under unloading, the values were found to be 12.7 $\mu$F, 3.9% and 4.3 $\mu$A, respectively. Like the instance of Example 1, here was also established that the electrolytic capacitor according to the present invention has very superior initial characteristics and reliability characteristics.

EXAMPLE 6

In an aqueous solution containing a pyrrole monomer (0.5M) and a support electrolyte sodium anthraquinone-2,6-disulfonate (0.1M), constant current electrolysis was carried out at 5 mA/cm$^2$ for 10 minutes using ITO glass as the anode and platinum as the cathode, to obtain on the anode a polymer film of polypyrrole doped with anthraquinone-2,6-disulfonate anions. This was peeled from the anode, and exposed to conditions of 125° C. to make measurement of changes with time of electrical conductivity. Results obtained are shown in FIG. 1 (by the line with circles).

For comparison, also shown together in FIG. 1 are examples of a polypyrrole prepared in the same manner as the above except that sodium p-toluenesulfonate was used as the support electrolyte, and a polypyrrole prepared in the same manner as the above except that tetra-n-butylammonium perchlorate was used as the support electrolyte and acetonitrile was used as the solvent. (Results are shown by the line with triangles for the former, and the line with x-marks for the latter.)

As will be evident from these results, the capacitor comprising the polypyrrole doped with anthraquinone-2,6-disulfonate anions has very stable characteristics under high-temperature conditions.

EXAMPLE 7

On a 8×10 mm aluminum etched foil, a dielectric film was formed by anodic oxidation using an aqueous 3% ammonium adipate solution and applying a voltage of 35 V at about 70° C., followed by immersion in an aqueous 30% manganese nitrate solution and further heating at 250° C. for 10 minutes, thereby adhering thermally decomposed manganese dioxide on the surface. An anode was thus prepared. An auxiliary electrode made of stainless steel was brought into contact with the resulting anode foil, which were then immersed in an electrolytic solution comprising pyrrole (0.3M), sodium anthraquinone-2,6-disulfonate (0.1M) and water. Thus, an electrolytic polymer film comprising polypyrrole doped with anthraquinone-2,6-disulfonate anions was formed through the auxiliary electrode. The resulting electrolytic polymer film was washed with water and then dried. Thereafter, carbon paste and silver paste were coated on the electrolytic polymer film, a cathode lead was taken out, and further a sheathing was carried out using epoxy resin to obtain 5 pieces of capacitors. After aging at 13 V, average values for initial capacity and loss at 120 Hz were found to be 13.7 $\mu$F, 1.8% respectively. After the capacitors were left to stand at 125° C. for 500 hours under unloading, the values were found to be 13.3 $\mu$F and 1.9% respectively.

For comparison, capacitors were prepared in the same manner except that tetrabutylammonium perchlorate (0.15M) and acetonitrile were used in place of sodium anthraquinone-2,6-disulfonate and water, respectively. In this instance, the average values for initial capacity and loss at 120 Hz were found to be 12.7 $\mu$F and 3.4%, respectively. After the capacitors were left to stand at 125° C. for 500 hours under unloading, the values were found to be 7.5 $\mu$F and 7.1%, respectively.

As is evident from the above, when the polypyrrole doped with anthraquinone-2,6-disulfonate anions is used as the electrolyte, solid electrolytic capacitors can be obtained which have superior initial loss characteristics and also undergo less deterioration of the capacity and loss after they were left at a high temperature and under unloading, as compared with the case of the perchlorate anions. It was also seen that substantially the same results as the high-temperature shelf test were obtained as to the characteristics measured after the capacitors were left to stand for 500 hours under unloading in environment of 80° C. and a humidity of 90%, showing a sufficiently high humidity resistance. The above results establish that the electrolytic capacitor according to the present invention has very superior initial characteristics and reliability characteristics. Capacitors were also prepared here in the same manner as to instances in which ammonium anthraquinone-2,6-disulfonate and potassium anthraquinone-2,6-disulfonate were respectively used in place of sodium anthraquinone-2,6-disulfonate, and the same results as the instance of the corresponding sodium salt were obtained.

EXAMPLE 8

Example 7 was repeated but using sodium anthraquinone-2,7-disulfonate in place of sodium anthraquinone-2,6-disulfonate, to complete 5 pieces of capacitors. After aging at 13 V, average values for initial capacity and loss at 120 Hz were found to be 13.2 $\mu$F and 1.6%, respectively. After the capacitors were left to stand at 125° C. for 500 hours under unloading, the values were found to be 13.0 $\mu$F and 1.6%. Like the instance of Example 7, here was also established that the electrolytic capacitor according to the present invention has very superior initial characteristics and reliability characteristics. Capacitors were also prepared as to an instance in which the pyrrole was replaced with a mixture of pyrrole and N-methylpyrrole, and an instance in which the solvent was changed to acetonitrile and thiophene was further used, respectively. The same results as the above were also obtained.

EXAMPLE 9

Example 7 was repeated but using sodium anthraquinone-2-sulfonate in place of sodium anthraquinone-2,6-disulfonate, to complete 5 pieces of capacitors. After aging at 13 V, average values for initial capacity and loss at 120 Hz were found to be 13.4 $\mu$F and 2.0%, respectively. After the capacitors were left to stand at 125° C. for 500 hours under unloading, the values were found to be 13.1 $\mu$F and 2.2%. Like the instance of Example 7, here was also established that the electrolytic capacitor according to the present invention has very superior initial characteristics and reliability characteristics.

EXAMPLE 10

Example 9 was repeated but using sodium 2-methylanthraquinone-7-sulfonate in place of sodium anthraquinone-2-sulfonate, to complete 5 pieces of capacitors. After aging at 13 V, average values for initial capacity and loss at 120 Hz were found to be 13.3 $\mu$F and 1.8%, respectively. After the capacitors were left to stand at 125° C. for 500 hours under unloading, the values were found to be 13.0 $\mu$F and 2.2%. Like the instance of Example 9, here was also established that the electrolytic capacitor according to the present invention has very superior initial characteristics and reliability characteristics.

EXAMPLE 11

Example 10 was repeated but using sodium 2-dodecylanthraquinone-7-sulfonate in place of sodium 2-methylanthraquinone-7-sulfonate, to complete 5 pieces of capacitors. After aging at 13 V, average values for initial capacity and loss at 120 Hz were found to be 13.3 $\mu$F and 2.1%, respectively. After the capacitors were left to stand at 125° C. for 500 hours under unloading, the values were found to be 12.9 $\mu$F and 2.4%. Like the instance of Example 10, here was also established that the electrolytic capacitor according to the present invention has very superior initial characteristics and reliability characteristics.

In the foregoing Examples, description is made only about the instances where water is used as the solvent when pyrrole is used as the monomer. However, other solvents may also be used so long as they can dissolve the support electrolyte and monomer. The present invention is not limited by the type of solvents.

In the foregoing Examples, description is made only about the instances where the support electrolyte is used alone, but it may be used in the form of a mixture. As to the mixture of monomers, description is also made about the instances where pyrrole and N-methylpyrrole are used, but thiophene or a derivatives thereof can also be used in the form of a mixture.

In the foregoing Examples, description is also made about the instances where aluminum is used as the anode, but it is apparent from the support of the present invention that tantalum or titanium can also be used and there can be obtained solid electrolytic capacitors having superior reliability like the instance of aluminum.

EXAMPLE 12

A preferred embodiment of the method of manufacturing the solid electrolytic capacitor according to the present invention will be described below.

Figure 2A:
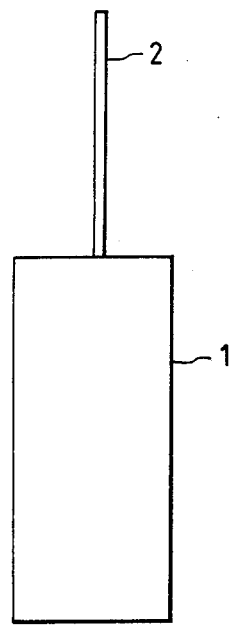
FIGS. 2A, 2B and 3 are views to describe a procedure of the method of manufacturing a solid electrolytic capacitor, used in an example of the present invention.
Figure 2B:
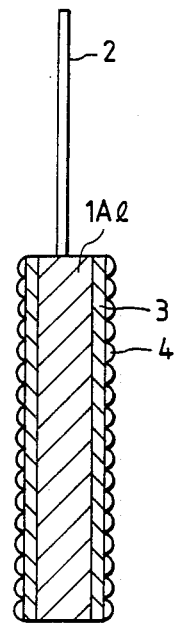
Figure 3:
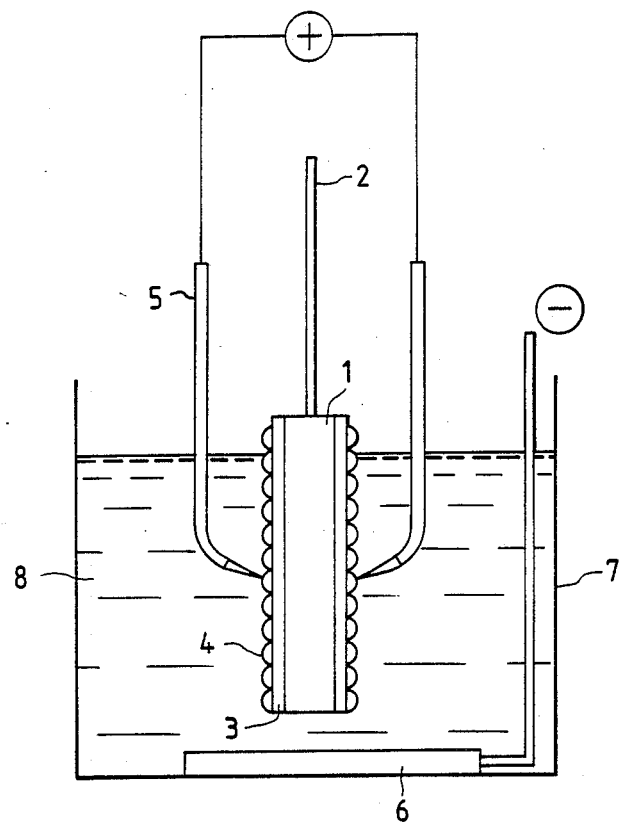

FIG. 2A and 2B are diagramatical illustrations to describe the method of manufacturing the solid electrolytic capacitor according to an example of the present invention. As shown in FIG. 2A, prepared is an aluminum foil 1 serving as the valve metal to which an anode lead electrode 2 for capacitors has been attached, and etching is first carried out so that the surface area an be increased. Next, as shown in FIG. 2B, an oxide film 3 comprising $Al_2O_3$ is formed using an aqueous adipic acid solution. The oxide film 3 is formed by a conventional method according to an electro-chemical means. Thereafter, the aluminum foil with the oxide film is immersed in an aqueous manganese nitrate solution, followed by thermal decomposition treatment in the air at a temperature of from 250° to 300° C. to form a $MnO_2$ film. Next, on the surface thereof, the electrolytic polymer film is formed. Since, however, the dielectric film is interposed, the electrolytic polymerization does not take place and no formation of the film is made if a voltage is applied using the anode 2 of the capacitor as a polymerization electrode. Now, as shown in FIG. 3, an electrolytic polymerization electrode 5 capable of initiating polymerization is externally provided in the manner that it comes into contact with the $MnO_2$ film, and an electrolytic polymerization opposite pole 6 is further provided separately from the electrolytic polymerization electrode 5. In a polymerization reaction vessel 7 as shown in FIG. 3, a polymerization solution comprising an electrolytically polymerizable monomer, a support electrolyte and a polymer having a carboxylic acid or hydroxyl group is provided. The polymer is selected from polyhydroxystyrene, novolac resin, polymethacrylic acid, polyacrylic acid, or copolymers of these. In this polymerization solution 8, aluminum foil 1 with the above $MnO_2$ film is immersed and then a voltage is applied at a level higher than the polymerization potential between the electrolytic polymerization electrode 5 and electrolytic polymerization opposite pole 6. As a result, a polymer film (not shown) is first formed on the electrode 5. Thereafter, starting from this place, the polymer film is made to gradually grow toward the surface of the manganese dioxide film 4. After the polymer film has completely covered the surface of the manganese dioxide film 4, the electrolytic polymerization is completed, and the surface of the polymer film is washed, followed by drying. Thereafter, though not shown, a lead electrode of the cathode for the capacitor is attached using carbon paste, silver paste, etc. Then, sheathing is finally carried out using epoxy resin or the like. The electrolytic polymerization electrode 5 may be provided in plurality. The electrolytic polymerization opposite pole 6 may be provided anywhere in the polymerization reaction vessel 7 so long as it is positioned separately from the electrolytic polymerization electrode 5. The electrolytic polymerization 5 should preferably be small in size than the electrolytic polymerization opposite pole 6.

Description follows in greater detail.

A material used under the rating of 16 V, 10 $\mu$F, having been conventionally subjected to etching, was used as the aluminum foil. After the film formed by chemical conversion was provided using the aqueous adipic acid solution, the aluminum foil with the oxide film was immersed in an aqueous 30% manganese nitrate solution, followed by thermal decomposition treatment in the air at 270° C. for 15 minutes. For comparison, a electrolytic polymerization solution containing no polymer was first prepared from pyrrole (0.5 M/Q), tetraethylammonium paratoluenesulfonate (0.1 M/Q) and acetonitrile. Using a platinum wire as the electrode at the electrolytic polymerization starting point, a voltage of 5 V was applied between this electrode and the cathode to carry out the reaction for 15 minutes. Thereafter, washing was carried out using alcohol followed by drying. Next, Aquadag (trademark; a product of Ascheson Colloids Co.) was coated on the whole surface of the resulting electrolytic polymer film, and thereafter the cathode lead electrode was attached using silver paste. Finally, sheathing was effected using epoxy resin. Next, the product was subjected to aging under application of a voltage of 20 V at room temperature for 2 hours. Characteristics of the resulting capacitor are shown below in Table 1 (based on average values of 5 pieces of samples; capacity in liquid: 10.0 $\mu$F (120 Hz)).

TABLE 1

| Capacitor characteristics Sample (1): | | | | | |
|---|---|---|---|---|---|
| 120 Hz | | 1 KHz | | Leakage current | ESR at |
| C | tan$\delta$ | C | tan$\delta$ | 16 V | 500 KHz |
| 9.5 $\mu$F | 2.5 % | 8.8 $\mu$F | 3.8 % | 0.5 $\mu$A | 30 m$\Omega$ |

A capacitor (Sample 2) prepared in the same manner, but using a polymerization solution in which 2% of polyhydroxystyrene was dissolved, showed the characteristics as shown in Table 2.

TABLE 2

| Capacitor characteristics Sample (2): | | | | | |
|---|---|---|---|---|---|
| 120 Hz | | 1 KHz | | Leakage current | ESR at |
| C | tan$\delta$ | C | tan$\delta$ | 16 V | 500 KHz |
| 9.7 $\mu$F | 2.7 % | 8.9 $\mu$F | 4.0 % | 0.1 $\mu$A | 35 m$\Omega$ |

As is evidently seen from the tables, the capacity value at 120 Hz, for example, keeps a value as very high as 9.7 $\mu$F (approximately 7 $\mu$F in conventional solid electrolytic capacitors using, e.g., TCNQ salts). The equivalent series resistance (ESR) at 500 KHz also shows a value as very small as 35 m$\Omega$ for aluminum electrolytic capacitors, showing that the high frequency characteristics are superior. The leakage current also showed a value as very small as 0.1 $\mu$A compared with Sample (1).

As reliability tests, high-temperature shelf tests at 125° C. for 700 hours (H) and high-temperature and high-humidity tests (70° C., 90% RH, 200 H or more) were carried out on Samples (1) and (2) to obtain the results as shown below.

TABLE 3

| Reliability test results | | |
|---|---|---|
| | Sample (1) $\Delta$C (120 Hz) | Sample (2) $\Delta$C (120 Hz) |
| 125° C., after 700 H | −8% | −3% |
| 70° C., 90% RH, after 200 H | −25% | −5% |

As the polymer to be dissolved in the polymerization solution, similar results were also obtained when other novolac resin, methacrylic acid, acrylic acid, or copolymers of these, was used.

As described in the above, the present invention after all provides a solid electrolytic capacitor and a method of manufacturing the same in which the conductive polymer having a repeating unit of at least one compound selected from a heterocyclic compound and containing as a dopant at least one anion selected from a naphthalenesulfonate, an alkyl naphthalenesulfonate at least one of hydrogen atoms on the naphthalene ring of which has been substituted with an alkyl group having 1 to 12 carbon atoms, an anthraquinonesulfonate, and an alkyl anthraquinonesulfonate at least one of hydrogen atoms on the anthraquinone ring of which has been substituted with an alkyl group having 1 to 12 carbon atoms, is used as the electrolyte. Thus, the present invention is advantageous in that a solid electrolytic capacitor can be obtained with ease, which has superior initial characteristics, in particular, leakage current characteristics, may undergo less deterioration in the capacity, loss and leakage current when left to stand at a high temperature under unloading or left to stand at a high humidity under unloading, and has superior reliability characteristics.

In the preferred embodiment of the method of manufacturing the solid electrolytic capacitor according to the present invention, the electrolytic polymer film is formed from the polymerization solution containing the polymer having a carboxylic acid group or a hydroxyl group, after manganese dioxide has been adhered on the oxide film. Thus, it has become possible to provide a solid electrolytic capacitor having superior high frequency characteristics and reliability (high-temperature shelf stability, humidity resistance, leakage current).

What is claimed is:

1. A solid electrolytic capacitor comprising;
   an electrolyte comprising a conductive polymer (i) having a repeating unit of at least one compound selected from a heterocyclic compound and (ii) containing as a dopant at least one anion selected from a naphthalenesulfonate, an alkyl naphthalenesulfonate at least one of hydrogen atoms on the naphthalene ring of which has been substituted with an alkyl group having 1 to 12 carbon atoms, an anthraquinonesulfonate, and an alkyl anthraquinonesulfonate at least one of hydrogen atoms on the anthraquinone ring of which has been substituted with an alkyl group having 1 to 12 carbon atoms;

said electrolyte being provided on a valve metal on the surface of which a dielectric film is formed by anodic oxidation or anodic chemical conversion.

2. A solid electrolytic capacitor according to claim 1, wherein said heterocyclic compound is selected from the group consisting of pyrrole, thiophene, furan, and derivatives thereof.

3. A solid electrolytic capacitor according to claim 2, wherein said heterocyclic compound is pyrrole or thiophene.

4. A solid electrolytic capacitor according to claim 1, wherein said naphthalenesulfonate is selected from the group consisting of sodium naphthalenesulfonate, ammonium naphthalenesulfonate, and potassium naphthalenesulfonate.

5. A solid electrolytic capacitor according to claim 4, wherein said naphthalenesulfonate is sodium naphthalenesulfonate.

6. A solid electrolytic capacitor according to claim 1, wherein said alkyl naphthalenesulfonate is selected from the group consisting of an isopropylnaphthalenesulfonate, a triisopropylnaphthalenesulfonate, a n-dibutylnaphthalenesulfonate, and a n-dodecylnaphthalenesulfonate.

7. A solid electrolytic capacitor according to claim 6, wherein said alkyl naphthalenesulfonate is sodium isopropylnaphthalenesulfonate, sodium triisopropylnaphthalenesulfonate, sodium n-dibutylnaphthalenesulfonate, or sodium n-dodecylnaphthalenesulfonate.

8. A solid electrolytic capacitor according to claim 1, wherein said anthraquinonesulfonate is selected from the group consisting of sodium anthraquinonesulfonate, ammonium anthraquinonesulfonate, and potassium anthraquinonesulfonate.

9. A solid electrolytic capacitor according to claim 8, wherein said anthraquinonesulfonate is sodium anthraquinone-2,6-disulfonate, ammonium anthraquinone-2,6-disulfonate, potassium anthraquinone-2,6-disulfonate, or sodium anthraquinone-2-sulfonate.

10. A solid electrolytic capacitor according to claim 1, wherein said alkyl anthraquinonesulfonate is selected from the group consisting of a methylanthraquinonesulfonate, and dodecylanthraquinonesulfonate.

11. A solid electrolytic capacitor according to claim 10, wherein said alkyl anthraquinonesulfonate is sodium 2-methylanthraquinone-7-sulfonate, or sodium 2-dodecylanthraquinone-7-sulfonate.

12. A solid electrolytic capacitor according to claim 1, wherein said valve metal comprises aluminum, tantalum or titanium.

13. A method of manufacturing a solid electrolytic capacitor, comprising;
    forming a dielectric film on a valve metal;
    adhering manganese dioxide on said dielectric film; and
    thereafter further forming thereon an electrolyte comprising a conductive polymer (i) having a repeating unit of at least one compound selected from a heterocyclic compound and (ii) containing as a dopant at least one anion selected from a naphthalenesulfonate, an alkyl naphthalenesulfonate at least one of hydrogen atoms on the naphthalene ring of which has been substituted with an alkyl group having 1 to 12 carbon atoms, an anthraquinonesulfonate, and an alkyl anthraquinonesulfonate at least one of hydrogen atoms on the anthraquinone ring of which has been substituted with an alkyl group having 1 to 12 carbon atoms, by electrolytic polymerization.

14. A method of manufacturing a solid electrolytic capacitor according to claim 13, wherein said heterocyclic compound is selected from the group consisting of pyrrole, thiophene, furan, and derivatives thereof.

15. A method of manufacturing a solid electrolytic capacitor according to claim 14, wherein said heterocyclic compound is pyrrole or thiophene.

16. A method of manufacturing a solid electrolytic capacitor according to claim 13, wherein said valve metal comprises aluminum, tantalum or titanium.

17. A method of manufacturing a solid electrolytic capacitor, comprising the steps of:
    forming on a valve metal an anodized film and thereafter adhering thereon manganese dioxide; and
    forming a film of a conductive electrolytically polymerized polymer, using a polymerization solution comprising a solvent, a monomer, an electrolyte and a polymer having a carboxylic acid group or a hydroxyl group wherein said polymer contained in said polymerization solution is selected from the group consisting of polyhydroxystyrene, novolac resin, polymethacrylic acid, polyacrylic acid, and copolymers thereof.

18. A method of manufacturing a solid electrolytic capacitor according to claim 17, wherein said conductive electrolytically polymerized polymer is a polymer obtained by anodic oxidation polymerization of a monomer selected from the group consisting of pyrrole, thiophene, and derivatives thereof.

* * * * *